United States Patent
Resetarits et al.

[11] Patent Number: 6,131,891
[45] Date of Patent: Oct. 17, 2000

[54] FRACTIONATION COLUMN CONTAINING STACKED FRACTIONATION TRAYS

[75] Inventors: Michael R. Resetarits; Nicholas F. Urbanski, both of De Pew; Mohamed S. Shakur, Amherst, all of N.Y.

[73] Assignee: UOP LLC, Des Plaines, Ill.

[21] Appl. No.: 09/275,249

[22] Filed: Mar. 24, 1999

Related U.S. Application Data

[60] Provisional application No. 60/079,981, Mar. 30, 1998.

[51] Int. Cl.⁷ ......................................................... B01F 3/04
[52] U.S. Cl. ..................... 261/114.1; 202/158; 261/114.5
[58] Field of Search ............. 261/97, 113, 114.1–114.5; 202/158

[56] References Cited

U.S. PATENT DOCUMENTS

| | | | |
|---|---|---|---|
| 1,811,627 | 6/1931 | Heid ...................................... | 261/114.1 |
| 2,998,234 | 8/1961 | Haselden ................................. | 261/113 |
| 3,179,389 | 4/1965 | Nutter .................................... | 261/114.1 |
| 3,410,540 | 11/1968 | Bruckert ................................. | 261/113 |
| 3,440,018 | 4/1969 | Eckert .................................... | 261/97 X |
| 3,928,513 | 12/1975 | Leva .................................... | 261/114.5 X |
| 4,133,852 | 1/1979 | Dinicolantonio et al. ........ | 261/114.4 X |
| 4,159,291 | 6/1979 | Bruckert et al. ..................... | 202/158 X |
| 4,808,350 | 2/1989 | Robbins et al. ....................... | 261/97 X |
| 5,244,604 | 9/1993 | Miller et al. ............................... | 261/97 |
| 5,382,390 | 1/1995 | Resetarits et al. ................... | 261/114.3 |
| 5,407,605 | 4/1995 | Resetartis et al. ......................... | 261/98 |
| 5,547,617 | 8/1996 | Lee et al. .............................. | 261/114.5 |

OTHER PUBLICATIONS

M.R. Resetarits and R.J. Miller. "Increase demethanizer efficiency and capacity." *Hydrocarbon Processing*, Oct. 1991.

Nutter Engineering. *Package Trays for Pipe–Size Process Vessels*. Bulletin PT–1, undated.

*Primary Examiner*—Richard L. Chiesa
*Attorney, Agent, or Firm*—John J. Tolomei; John F. Spears, Jr.

[57] ABSTRACT

A novel fractionation column (1) internal structure consists of groups of fractionation trays in which the upper trays rest upon the bottommost tray of the group, which is the only tray of the group supported by the column wall. Preferably the downcomers (13) or disengagement plates of the upper tray rest upon the tops of the downcomers (13) of the next lower tray. Only the bottom tray is supported as by a ring (12) attached to the column.

13 Claims, 6 Drawing Sheets

FRACTIONATION COLUMN CONTAINING STACKED FRACTIONATION TRAYS

This application claims priority under provisional application Ser. No. 60/079,981 filed Mar. 30, 1998.

FIELD OF THE INVENTION

The invention is a novel arrangement of the fractionation trays used in distillation columns which separate volatile chemical compounds via fractional distillation. The invention more specifically relates to a structure, for use in a distillation column, formed by stacking two or more fractionation trays of similar design on top of one another to form a tray bundle.

BACKGROUND OF THE INVENTION

Fractionation trays are widely used in the petrochemical and petroleum refining industries to promote the multistage vapor-liquid contacting performed in fractionation columns. The normal configuration of a fractionation column includes about 10 to 120 individual trays. Normally the structure of each tray in the column is the same. The trays are mounted horizontally at uniform vertical distances referred to as the tray spacing of the column. This distance may vary within different parts of the column but is normally considered constant. The trays are supported by a ring welded or bolted to the inner surface of the column. From time to time it is necessary or desired to change the number and or type of trays employed in the column, which may in turn, lead to a need to move the support rings to different elevations.

RELATED ART

The long and extensive use of fractionation trays has led to the development of many different designs for trays and of different methods of supporting them in a column. Examples of fractionation trays include the multiple downcomer design shown in U.S. Pat. No. 3,410,540 issued to W. Bruckert. This reference shows the preferred box-like downcomer design used in the subject apparatus and also describes several different possible mechanical arrangements of the liquid sealable outlet means present at the bottom of the downcomer. FIGS. 2, 3 and 5 of U.S. Pat. No. 5,547,617 issued to A. T. Lee et al. show other arrangements of the components of fractionation tray having parallel rectangular downcomers spread across the tray. This reference also show details of the support means employed to attach the individual trays to the wall of the column.

The details of one method of installing trays in a column are described in an article in the October 1991 edition of Hydrocarbon Processing. The structural features described in the article include the use of mounting rings attached to the sidewall of the column to support the trays. The article describes how the mounting ring for one tray can be supported by another ring rather than being attached to the wall of the column. This arrangement can be employed when it is desired to increase the number of trays in a column without attaching new support rings to the column wall.

U.S. Pat. No. 1,811,627 issued to J. B. Heid describes a dephlegmator or column comprising layers of inverted V-shaped baffles formed from imperforate inclined plates. The bottom of the plates rests upon the ridges of the plates of the next lower layer of plates.

One type of distillation apparatus available commercially is the "cartridge" or "package" tray system, which is normally employed in relatively small diameter, low flow rate columns. An example of this system is shown in U.S. Pat. No. 3,179,389 issued to I. E. Nutter. The trays are assembled in groups held together by extension rods and spacing tubes, and the preassembled tray groups are loaded into the top of the column. The first group rests on a support located below the first tray, and the other groups rest upon this lowermost group. The trays do not seem to rest upon one another. The circumferences of the trays are sealed against the inside surface of the column wall by gaskets composed of rubber or polymeric materials. Mechanical details of one version of this system are provided in Bulletin PT-1 from Nutter Engineering.

U.S. Pat. No. 5,244,604 issued to R. J. Miller et al. shows a fractionation column containing a number of multiple downcomer fractionation trays. The bottom edge of the downcomers of an upper tray are attached to the upper edge of the inlet of the downcomer next below. However this connection is solely for purposes of directing downward liquid flow and preventing the liquid from flowing into the downcomer of the next lower tray. The connection does not support the upper tray as shown by the support rings 8 provided for each tray.

U.S. Pat. No. 5,382,390 issued to M. R. Resetarits et al. illustrates (FIG. 10) a castellated disengagement plate or "antijump" baffle centered within a downcomer and extending upward toward the next tray above. It is mentioned that the baffle may be attached to the downcomer to further stiffen the baffle, but the patent describes a separation between the top of the baffle and the bottom of the downcomer.

U.S. Pat. No. 5,407,605 issued to M. R. Resetarits et al. illustrates alternative constructions of the parallel downcomers which may be employed on a multiple downcomer fractionation tray including the use of V-shaped downcomers separated by planar decking areas.

U.S. Pat. No. 2,998,234 issued to G. Haselden a zigzag grid packing comprising a plurality of corrugated plates which are stacked upon one another. These are grid packing as the vapor and liquid in the column are not brought into contact in a manner which generates froth, but rather provides a large surface area thin liquid film on the extensive surface provided by the plates.

SUMMARY OF THE INVENTION

The invention is an apparatus for use in a fractionation column employed in the separation of volatile chemical compounds. The invention is characterized by the fact that small groups of vertically adjacent fractionation trays are stacked one upon another with each upper tray supported by the next lower tray. The downcomers of the upper tray preferably rests upon the lower tray. This arrangement provides several advantages including a reduced time for the construction or revamping of a particular column and a reduced cost for the overall system and installation. The invention is characterized by the fractionation trays of the column being separated into groups of two or more trays, with only the lowermost tray of the grouping being supported by a ring or other support physically attached to the wall of the column. The upper trays of the group rest upon the lowermost tray. A second distinguishing feature of the invention is the preference for an intentional provision of a small but significant discoid gap between the outer edge of the upper fractionation trays and the inner surface of the surrounding column.

One broad embodiment of the subject invention may be characterized as an apparatus for performing fractional distillation which comprises an enclosed cylindrical column having upper and lower ends and a cylindrical inner surface; an upper first and a lower second fractionation tray of similar design, with the fractionation trays having a downcomer which comprises a sidewall which extends away from a vapor-liquid contacting area formed by perforated decking, and with the upper first tray being supported in place within the column by the lower second tray and with the lower second tray being supported by a support attached to the column. The upper tray may rest upon the downcomer(s) of the lower tray or upon vertical baffles rising out of the downcomer(s) of the lower tray.

DETAILED DESCRIPTION AND PREFERRED EMBODIMENTS

Fractionation columns are used in the separation of a wide variety of chemical compounds in the petroleum refining, petrochemical and chemical industries. They are used for instance in the separation of various paraffinic hydrocarbons such as the separation of butanes and pentanes, in removing contaminants including water from hydrocarbon streams and the separation of various alkyl aromatic hydrocarbons such as the separation of toluene from xylenes. Fractionation trays are also used for the separation of oxygenates such as ethers or alcohols from hydrocarbons, the separation of inorganics such as halogenated compounds, fluorocarbons and elemental gases and other separations too numerous to mention. Fractionation columns and trays therefore have great utility in many industries.

During the fractional distillation process, vapor generated at the bottom of the column rises through the large number of small perforations spread over the decking area of the tray, which supports a quantity of liquid. The passage of the vapor through the liquid generates a layer of bubbles referred to as froth. The high surface area of the froth helps to quickly establish a compositional equilibrium between the vapor and liquid phases on the tray. The vapor loses less volatile material to the liquid and thus becomes slightly more volatile as it passes upward through each tray. The concentration of less volatile compounds in the liquid increase as it moves down from tray to tray. The liquid separates from the froth and travels downward to the next lower tray. This froth formation and separation is performed on each tray. Trays therefore perform the two functions of contacting the rising vapor with liquid and then allowing the two phases to separate and flow in different directions. When the steps are performed a suitable number of times, the process can lead to highly effective separation of chemical compounds based upon their relative volatility.

Fractionation columns are often revamped in order to increase the capacity or separation effectiveness of the column. If the column contains fractionation trays, the revamp normally involves modifications to the fractionation tray systems. These modifications may include the installation of a completely different type of fractionation tray or the installation of a different number of fractionation trays or a combination situation in which an increased number of a different type of fractionation tray is installed in the column.

In any situation this revamping of the fractionation column is a labor intensive situation which must occur within a short turnaround time and within the close confines of the column. The fact that the removal of the old trays and the installation of the new trays must occur within these close confines increases the time necessary for the revamping procedure. This in turn results in-the column being out of service for a longer time and the overall petrochemical or petroleum refining unit in which the column is employed also being out of service for at least this same period of time. It is therefore desirable to develop systems which lead to faster and more economical revamping of fractionation columns and it is an objective of the subject invention to provide such a system. It is a further objective of the invention to minimize the amount of work which must be done to attach or move the support elements attached to the internal surface of a fractionation column at those times at which fractionation trays are installed or changed within the column. Other objectives are to simplify tray design and to reduce the installed cost of fractionation trays.

In the subject invention two or more tray-like vapor-liquid contacting systems are nested together into a single unit characterized in that only the lowermost of these vapor-liquid contacting trays is supported by attachment to or by a support attached to the inner surface of the wall of the fractionation column. Each of the individual vapor-liquid contacting trays or subunits will comprise at least one downcomer. Preferably they will comprise a plurality of individual downcomers. Most preferably they will comprise several parallel downcomers separated by areas of perforated decking, with the decking comprising a single horizontal planar surface, which defines the level of the tray.

Preferably each of the trays in a subunit or grouping of trays according to the invention has a similar structure. However, there is no set requirement in the subject invention for each of the vertically adjacent trays to have an identical structure. The trays may differ in a minor regard such as the relative amount of decking versus downcomer inlet area provided on a tray, or the size and distribution of the vapor perforations or passageways in the decking area, the construction of the decking area due to the necessity of the upper trays being self-supporting (not receiving support from the column) or by the presence or absence of various mechanical stiffeners, connection devices, etc. The vertically adjacent trays of any grouping may also be significantly different, such that the lowermost tray may comprise the preferred rectangular or trough-like downcomer while the upper trays would comprise the alternative V-shape downcomers.

An additional characteristic of one embodiment of the invention is the presence of a intentional unsealed gap between the outer edge of the upper fractionation trays of each grouping of trays and the inner surface of the column wall. In the prior art it is inherent that some space would be left between these elements to facilitate the installation of the tray into the column, that is to allow some leeway for the tray to fit within the column wall. The gap would then be sealed as by an overlay. According to the subject invention there is a significant unsealed gap remaining at this point. Further, this annular gap is distinguished by the fact that no effort is made to close the gap as by providing an overlap between the edge of the tray and any supporting element attached to the column wall. That is, the column internal wall surface is substantially smooth with no means being attached to it for support of the upper tray(s) or for sealing the gap between the inner surface of the column and the edge of the tray.

This preference for a gap however does not overrule the possibility of employing several adjustable bar-like extensions which extend across the gap to stabilize the entire group structure within the column. That is, three or more rod-like fingers could project from the tray at different points and touch the column wall for the purpose of preventing the tray from rocking or moving from side to side. This may also be beneficial to prevent the upper tray from moving in a way which may eventually erode or cause damage to either tray at the points of contact between trays. These positioning devices may also aid in maintaining the position of the upper tray if such positioning is critical to adequate support and structural strength of the unitary system.

The subject invention finds particular utility with multiple downcomer type trays for at least two reasons. First the structure of this type of tray with its parallel downcomers spread across the surface of the tray results in a structure highly adaptable to a stacked configuration without the addition of significant additional structure. The lower tray(s) may need to be engineered for a higher load, but the number of tray pieces and their overall design can remain unchanged. Second, the long length of the available downcomer inlets leads to multiple downcomer trays normally producing a lower froth height. This, and the lower pressure drop which accompanies it, allows multiple downcomer trays to be installed at lower tray spacings. This is conducive to using a stacked configuration.

The subject concept includes the use of trays of totally conventional design in a stacked configuration. However, it is recognized that this could lead to undesirably short tray spacings, and the option exists of redesigning the trays to increase the tray spacing. For instance, the height of the downcomer sidewall can be increased. The height of the portion of the downcomer wall which projects above the decking could be increased with openings in the wall being provided to compensate for the increased height. The height of the castellated disengagement plate could also be increased.

Figure 1:
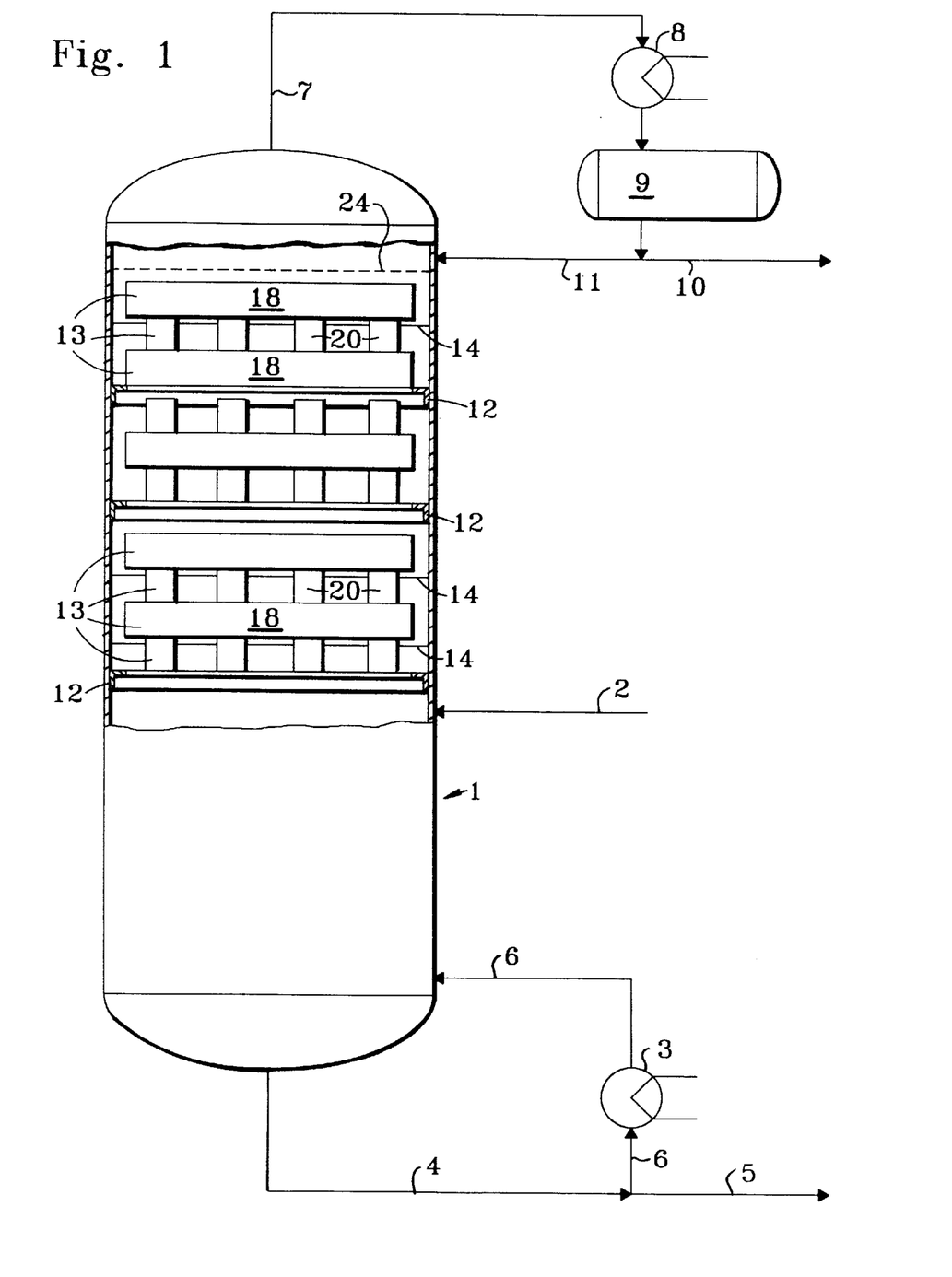
FIG. 1 is a simplified partially sectioned drawing showing a fractionation column 1 containing two groupings of three fractionation trays and a grouping of four fractionation trays. In each group only the bottom tray rests upon a support ring 12 attached to the inner surface of the column.

Referring now to FIG. 1, there is shown a fractionation column 1 which overall may be built in a customary manner according to the prior art. The column will comprise a vertical cylindrical process vessel of customary design having an enclosed upper and lower ends and associated vapor and liquid transfer lines. The transfer lines include a feedline 2 which provides a mixture of hydrocarbons or other chemicals to the fractionation column for separation therein. While the Drawing illustrates the feedline 2 entering a midpoint of the column, it could enter nearer either the top or the bottom of the column. The feed stream of line 2 could in some instances even be admixed with the reflux line or passed into the overhead receiver of the column. The inventive concept resides in the structure of the vapor-liquid contacting apparatus employed within the column and thus the external lines, outer vessel and external equipment do not form a part of the invention or a limitation to the invention. They are shown only for ensuring an understanding of the structure and operation of the invention.

Upon entering the fractionation column, the chemical compounds of the feedline 2 are separated with the more volatile compounds entering the vapor phase which rises through the column. The most volatile compound(s) are concentrated into an overhead vapor stream which exits the upper end of the fractionation column 1 through the overhead vapor line 7. The overhead vapor stream passes through the overhead condenser 8 wherein indirect heat exchange results in the condensation of at least a sizeable portion of this stream prior to passage of the overhead stream into the overhead receiver 9. Liquid is withdrawn from the overhead receiver 9 and divided into a net overhead product stream removed from the column via line 10 and a reflux stream returned to the column through line 11. The returning liquid-phase reflux material is distributed in a uniform manner over the cross-section of the column by means of a distributor 24.

The reflux liquid flows onto a topmost fractionation tray and then enters the downcomers 13 distributed across the tray. In the embodiment shown in FIG. 1, three separate fractionation trays are mounted upon a single support ring 12 near the upper end of the column. Each of these trays comprises four downcomers 13. Each tray also comprises five horizontal areas of perforated tray decking 14 of a conventional nature, with the tray decking extending between the sidewalls 18 of the downcomers 13 and bordering the terminal downcomer. FIG. 1 shows two bundles of three trays and one bundle of four trays.

The liquid phase flows downward through the column gradually changing in composition as the vapor and liquid phases exchange components. After passing through the third bundle of trays shown in FIG. 1, the descending liquid becomes admixed with the liquid-phase components of the feedstream entering through line 2. The resultant liquid phase material would continue downward through the lower portion of the column 1. The trays in the lower portion of the column are not shown for simplicity. These trays may be the same as those employed in the upper portion of the column or they may differ. They may differ in being of a totally different type such as crossflow trays or the trays may be of the same type, that is, multiple downcomer trays but with each tray being individually supported by the column. Alternatively, the lower portion of the column could contain packing material instead of trays. Regardless of the composition of the vapor-liquid contacting device(s) present in the lower portion of the fractionation column 1, there is removed at the lowermost end through line 4 a stream of liquid phase material referred to as the bottoms liquid. This liquid contains the least volatile components of the feed. The bottoms liquid is divided into a first portion carried by line 5 which is removed from the separation process as the net bottoms stream and a second portion which is passed through line 6 into the reboiler 3. Heat energy is added to this stream in the reboiler 3 typically causing at least partial vaporization and some heating of the liquid flowing through this line. The thus formed reboiling material is then passed into the bottom of the fractionation column through line 6 adding the necessary heat and vapors to the bottom of the column to perform fractional distillation.

Figure 2:
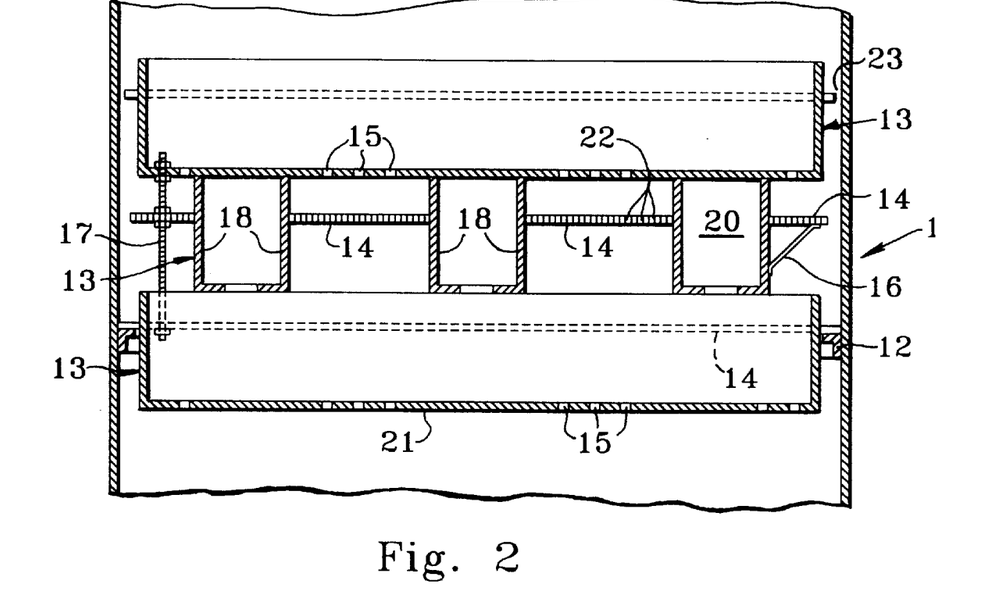
FIG. 2 is an expanded and more detailed depiction of a group of the multiple downcomer fractionation trays shown in FIG. 1.

FIG. 2 is a cross-sectional diagram looking horizontally across a small portion of the fractionation column containing three trays similar to those of FIG. 1. This figure shows three multiple downcomer fractionation trays, with two of the trays being stacked upon the lowermost tray. The structure of each of the trays is essentially identical. That is, each of the three trays comprises three rectangular box-like downcomers 13 of similar design separated by planar decking 14 through which the rising vapor passes. Each downcomer is formed by two parallel planar sidewalls 18, two planar endwalls 20 and a single downcomer bottom plate 21. In the embodiment shown in this Figure, the sidewalls and endwalls are imperforate and only the bottom plate has perforations intended for liquid flow when the column is onstream. The total perforations or downcomer outlets 15 in the bottom plates are sized sufficiently to handle all of the downward liquid flow through the column when the column is operating. These openings are therefore distinguishable from other much smaller and less numerous openings sometimes provided on fractionation trays for the purpose of allowing the low spots of a tray to drain when the tray and the fractionation column as a whole are being taken out of service. Likewise the more numerous openings in the tray decking are sized to carry the entire upward vapor flow. Embodiments having different downcomer structures would also have this same liquid capacity.

The central point of the subject invention resides in the upper fractionation trays of a tray group, or bundle, resting upon the top structure of the bottom tray of the group. Preferably this top structure is the upward extending portion of the sidewalls forming the downcomer of the next lower tray. As may be seen from FIG. 2, there is no support ring or lip 12 provided for supporting the middle fractionation tray or for the upper fractionation tray. These trays rest solely upon the next lower tray and there is no attachment to the fractionation column. While means may be provided to secure the trays to one another and/or to prevent their movement from side to side within the column as pointed out above, the trays are not attached to traditional column mounted support means.

Preferably, a rather sizeable annular gap 23 intentionally remains between the outer edge of the decking 14 of the tray and the inner surface of the fractionation column. While a fractionation tray must be smaller than the internal diameter of the column to allow its installation and movement in the subject invention this gap 23 is larger than this required spacing. As also pointed out above, it would be customary in the art to totally seal any gap by means of an underlying support ring. In the subject invention this gap is on the order of from 1½ to 5 centimeters and more preferably is at least 2 centimeters wide as measured from the end of the decking to the inner surface of the cylindrical wall of the column. As the cylindrical wall of the column is often not perfectly cylindrical the width of the gap between the outer edge of the tray and the inner surface of the column may vary considerably. The gap may exceed tolerances at some points due to the column being out-of-round. In the prior art ring supported systems the width of the ring allowed compensation for this variance. This problem may be dealt with by the use of movable decking sections which can be extended toward the column wall. The gap may be irregular due to variations in both the edge of the tray and the shape of the column. The gap is not believed to significantly impact tray performance due to the downward leakage of liquid. Any by-passed liquid or vapor is collected by the wall supported trays.

FIG. 2 also illustrates that the openings 15 in the bottom of the downcomer seal plate are spaced apart and grouped such that liquid descending from the downcomer falls upon the decking 14 rather than into the downcomer of the next lower tray.

FIG. 2 illustrates two of the many alternative possible mechanical devices which can be used to support the decking material 14 located in the two terminal moon, or crescent, sections of the tray; that is, those sections of the tray located between the outermost downcomers and the wall of the column. Additional support is required as only one side of this decking section is attached to a downcomer sidewall. In the prior art the rest of the decking material is normally supported by the column through a ring 12. The absence of such a ring in the subject invention eliminates this mode of support. As shown in FIG. 2, various bracing structures such as the arm-like support brace 16 or the threaded support rod 17 can be employed to support the decking material and prevent its movement. The support rods 17 can also extend to the trays above and below the relevant tray to thus attach the three trays and prevent their movement. The use of a unitary arch-like support having two legs attached near the end of the downcomer sidewalls and a peak attached to the decking is preferred to support the two terminal decking sections. Depending on the available opening at the top of the fractionation column, specifically whether the entire upper end of the column is removable, it may be possible to construct bundles of three or four fractionation trays bolted together at a number of places in the manner shown by connecting rods 17 and to then lower the fabricated bundle into the column.

Figure 3:
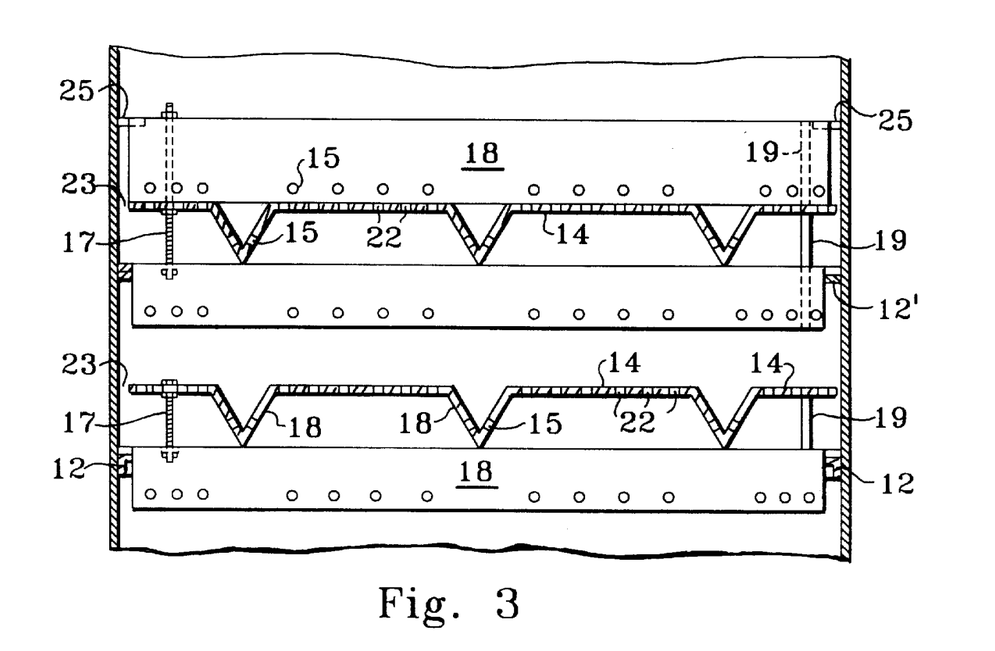
FIG. 3 illustrates a different embodiment of the invention in which the fractionation trays comprise V-shaped downcomers separated by sections of perforated planar decking 14.

FIG. 3 is a depiction similar to FIG. 2 except that a different type of fractionation tray is employed. The trays depicted in FIG. 3 do not have the rectangular downcomer structure of those depicted in FIG. 2. Rather they have a V-shaped structure formed by two planar sidewalls 18 which are joined together at their lowermost edge. The liquid sealable outlet of the downcomers is preferably not located at the very bottom of the downcomers but is instead located in the sidewall of the downcomer. This has been found to have beneficial effects in some instances, including an increased ability to have the liquid eject or jet outward from the downcomer for better distribution across the decking material 14 of the next lower tray. The liquid falls upon the decking 14 and is contacted by vapor rising upward through the perforations 22 in the decking thereby forming froth which occupies at least a sizeable portion of the volume between the trays. The froth flows into the rectangular inlet at the top of the downcomer and then begins to separate. The released vapor rises out of the downcomer leaving the clear liquid in the bottom of the downcomer.

In a manner similar to that shown in FIG. 2, the terminal portions of the decking 14 of the trays may be secured in place by one or more supports such as the threaded rods 17 or the vertical support braces 19. The threaded rods may join just two fractionation trays together or may join three or more fractionation trays together. For instance, FIG. 3 illustrates an upper bundle of three fractionation trays and a lower bundle of two fractionation trays both employing a threaded rod 17 on the left-hand side and a vertical support 19 on the right-hand side. It must be noted that these rods and braces only restrain the terminal portion of the two sides of the tray. Again, an archlike support is preferred. This preferred support may include a horizontal brace attached to the downcomer side wall, and the legs can be attached to end support plates extending outward past the ends of the downcomers to allow mounting closer to the column wall. They do not support the tray itself. The lower bundle is supported by an L-shaped lip 12 which encircles the inner surface of the column. The upper bundle is shown as being supported by a simple rectangular bar 12' attached to the inner surface of the column. This Figure shows two narrow centering bars 25 on the top tray. The bars extend across the gap 23 to prevent movement of the tray bundle. These bars may be attached to the tray after the bundle is installed, and may have a threaded portion to allow adjustment of their length.

Figure 4:
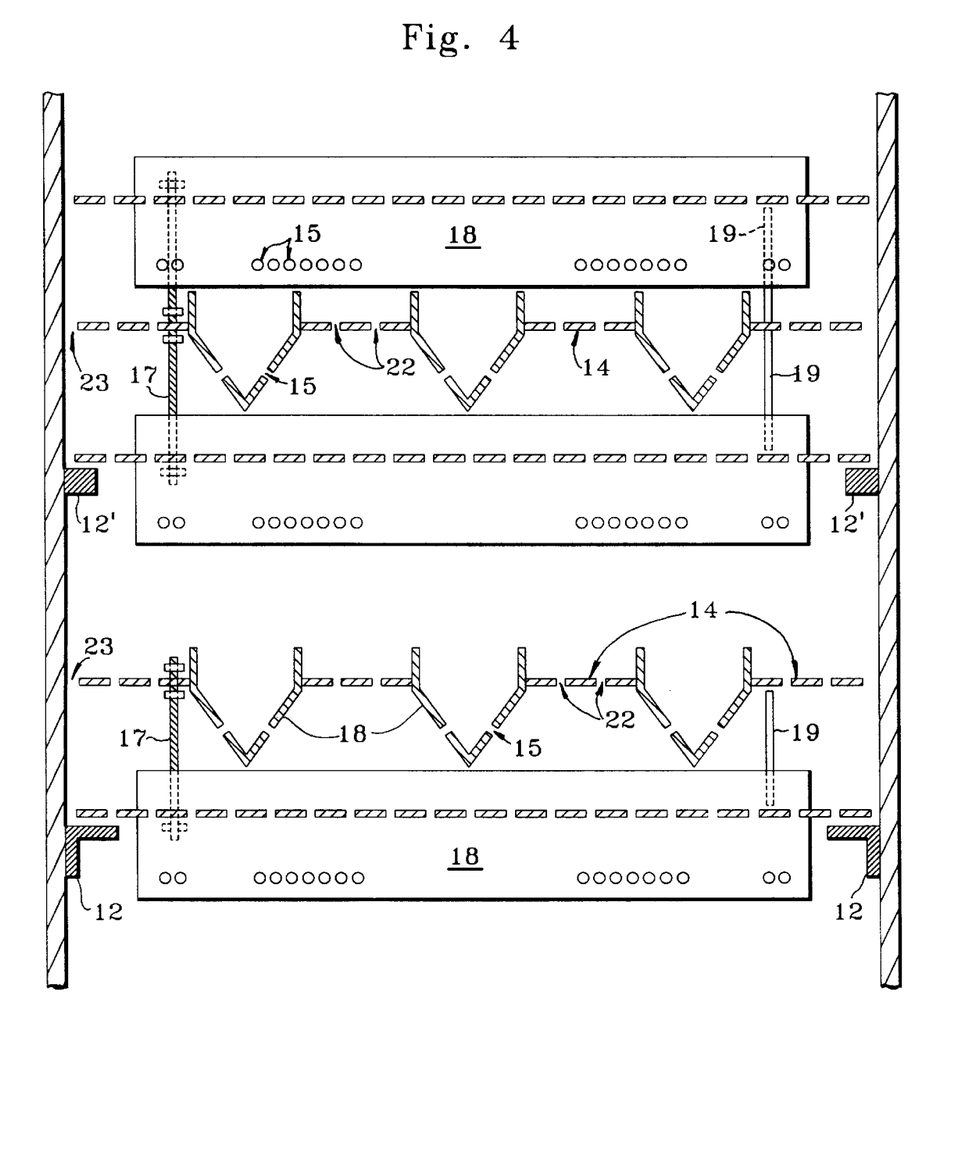
FIG. 4 illustrates a supported tray arrangement similar to FIG. 3 in which the sidewalls of the downcomer extend upward above the decking to provide an inlet weir.

FIG. 4 shows two tray bundles supported at an intermediate point in a column. The trays are similar to those shown in FIG. 3 but have vertical outlet weirs projecting above the vapor-liquid contacting surface of the tray defined by the horizontal decking 14. The downcomers of FIG. 4 are considered to be "V-shaped" despite the upper portion of the walls being vertical. This nomenclature is intended to primarily refer to the shape of the portion of the downcomer located below the tray decking.

Figure 5:
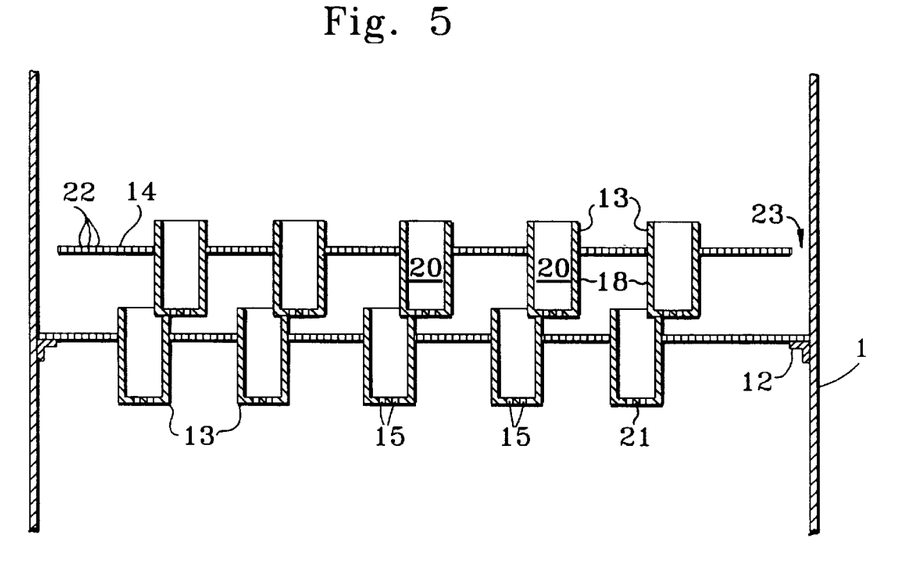
FIG. 5 illustrates another embodiment of the invention which employs parallel rectangular downcomers on vertically adjacent trays, with the downcomers partially overlapping at their point of intersection and support.

FIG. 5 illustrates yet another embodiment of the subject invention. In this embodiment the downcomers of the vertically adjacent trays are in alignment. In the previously illustrated embodiments, the downcomers of vertically adjacent trays are shown as being oriented in the more traditional perpendicular manner. That is, the downcomers on each tray in FIGS. 1–4 are perpendicular to those immediately above and below. In FIG. 5 however the downcomers are parallel on the vertically adjacent trays but slightly offset so that they cannot nest inside one another and more importantly the liquid spilling forth from the bottom of the downcomers does not fall into the inlet of the immediately lower downcomer. The downcomers illustrated in this figure are of rectangular construction similar to those described above and formed by two parallel sidewalls 18 and two parallel endwalls 20. The ends of the terminal downcomers would preferably have an appreciably greater separation from the wall of the column than the middle downcomers to encourage liquid flow around the end of the downcomer. FIG. 5 depicts a downcomer bottom plate 13 having a number of outlets 15 forming the bottom of each downcomer. Horizontal decking material 14 having numerous small perforations 22 spaced in a uniform pattern connects the downcomers and extends from the terminal downcomers toward the inner surface of the column. The lower tray is supported by the L-shaped support ring 12 attached to the inner surface of the column 1 while the upper tray rests upon the lower tray. The periphery of the upper tray is spaced apart from the inner surface of the column by the annular gap 23.

Figure 6:
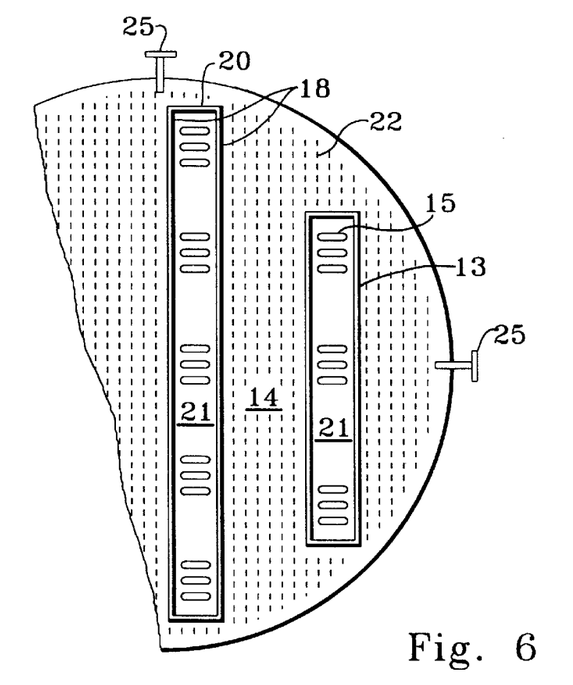
FIG. 6 illustrates an overhead view looking downward towards a portion of a fractionation tray having two parallel rectangular downcomers.

FIG. 6 is an overhead view of a fractionation tray which illustrates two rectangular downcomers 13 and the surrounding planar decking 14. The decking contains a large number of evenly distributed small diameter perforations 22 for the upward passage of all vapor moving upward in the column. The downcomers comprise the two planar sidewalls 18 and the two endwalls 20. The downcomers of this tray are therefore similar to those shown in FIGS. 2 and 5. The liquid sealable outlet in the bottom of the downcomers is comprised of a number of openings 15 grouped together at various points along the bottom plate selected such that the emerging liquid does not fall into the next lower downcomer. The elongated openings 15 differ from the smaller, e.g., circular openings shown in FIG. 4. They may be rectangular or have rounded ends. The exact size and shape of these openings is subject to much variation and does not form a part of the inventive concept. This view also shows two of four centering bars 25 spaced around the periphery of the tray to center and stabilize the tray bundle. The terminal portion of the bars shown in this embodiment are curved to engage the inner surface of the column. The bars 25 ensure the gap between the tray and column is uniform. They may be attached (welded or bolted) to the upper or lower surface of the decking or to the downcomers. Alternatively they may be threaded and thereby their length may be adjustable to allow for centering or retraction.

Figure 7:
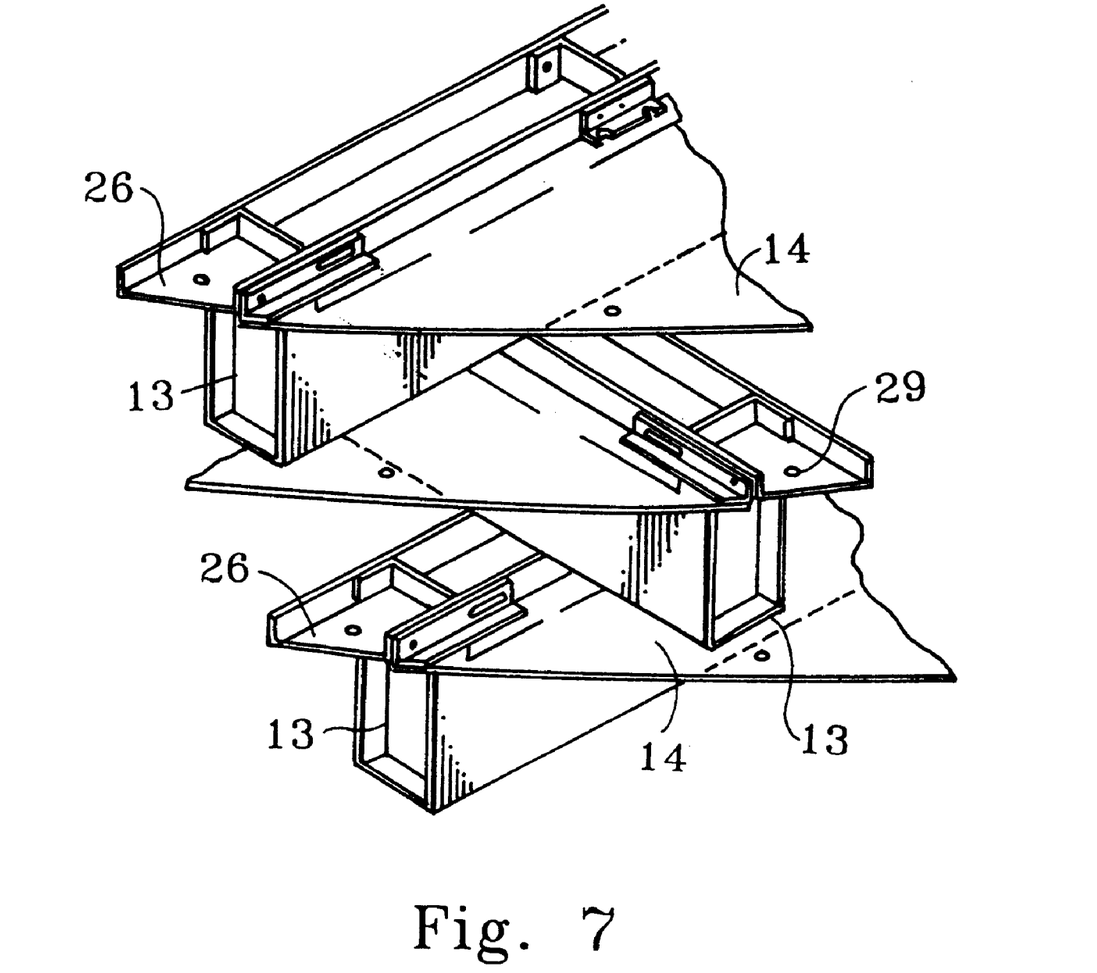
FIG. 7 is a detailed drawing of the end portion of downcomers of three stacked trays.

FIG. 7 is a detailed drawing of the end sections of downcomers 13 on three stacked trays. Portions of decking 14 on one of the two terminal decking sections of the tray are also shown. This view clarifies the preferred structure of the end support plate 26 which extends from the end wall of the downcomers to the edge of the tray and would rest on any support ring (not shown) provided to support the trays within a column. The support-plate has bent up sides having a height equal to the distance the side wall 18 extends above the decking 14. A drainage hole 29 is customarily provided. It is preferred to attach the support plate to the end of all downcomers including those downcomers which are not supported by a ring attached to the column.

Figure 8:
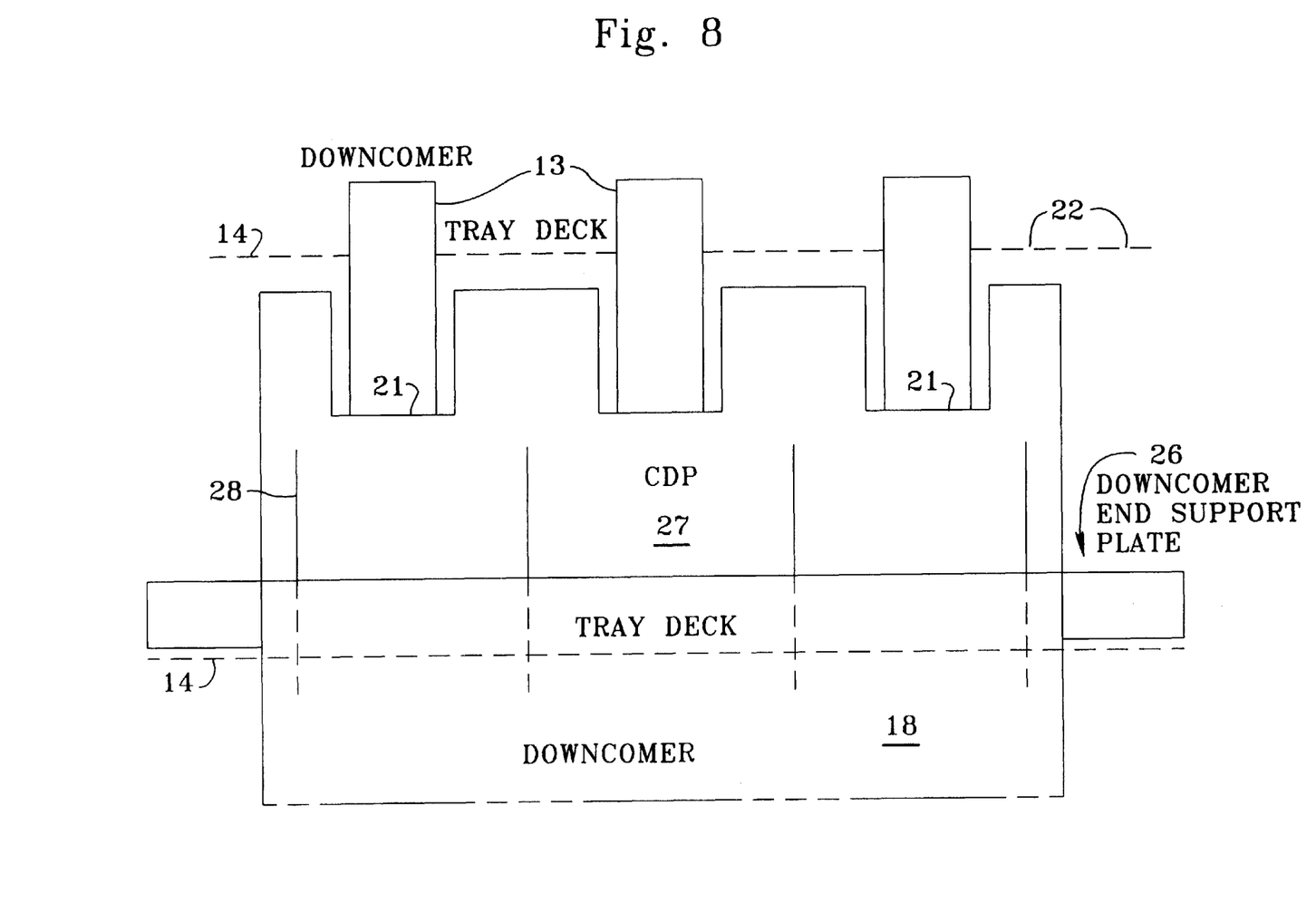
FIG. 8 is a simplified drawing of an embodiment in which the downcomers of the upper tray rests upon a castellated disengagement plate 27.

FIG. 8 is a simplified depiction of an embodiment of the invention in which the upper tray is supported by castellated disengagement plates (antijump baffles) 27. Preferably the number of plates is equal to the number of downcomers on the tray. These plates are centered in the downcomer and extend upward out of the downcomer in a vertical plane preferably parallel to the sidewalls 18 of the rectangular downcomer 13. The bottom plate 21 of the downcomer of the tray above rests upon the top edge of the notches cut into each disengagement plate. The disengagement plate 27 of the Figure extends the width of the downcomer 13 and is held in place by four centering brackets 28 which extend across the mouth of the downcomer perpendicular to the disengagement plate.

The embodiment of FIG. 8 finds utility when it is desired to provide a greater tray spacing without resorting to extending the depth of the downcomers as required to provide this tray spacing in a stacked tray configuration. It is projected to be a lower cost alternative to increasing the depth of the downcomers. The vertical plates 27 may be attached to the downcomer endwalls 20. They therefore extend downward into the downcomer a significant distance. When combined with the centering brackets 28, which are perpendicular to the sidewall 18 and preferably extend into the downcomer, they can significantly increase the rigidity of the downcomer thereby increasing its functionality as a cross-column support member. Further information on the construction of the plates 27 may be obtained by the previously cited U.S. Pat. No. 5,382,390.

The subject invention is readily applied to multiple downcomer trays such as described in the previously cited U.S. Pat. No. 3,410,540. Multiple downcomer trays have several distinguishing physical characteristics. For instance, a multiple downcomer tray does not have a "receiving pan". This is the normally imperforate section located below an outlet downcomer opening. It is the imperforate area of a tray upon which the liquid descending through the downcomer impacts before passing horizontally onto the decking of the tray. Receiving pans are normally located directly below the downcomer leading from the next above conventional fractionation tray. The horizontal decking surface area of the preferred embodiment of a multiple downcomer fractionation tray is divided into depressed areas functioning as downcomers and flat vapor-liquid contacting area normally referred to as decking. There are no imperforate areas allocated to receiving descending liquid from the tray located immediately above.

Another distinguishing feature of a typical multiple downcomer type fractionation tray is the provision of a relatively large number of parallel downcomers evenly spaced across the tray. Each tray can employ from one to fifteen or more downcomers. These downcomers are spaced relatively close together compared to the downcomers of crossflow fractionation trays as they are spread across the surface of the tray rather than just being at the periphery of the tray. The distance between adjacent downcomers (measured between their side walls) of a multiple downcomer tray will be between 0.2 and 2.0 meters and is preferably less than 0.5 meter. This results in a tray having a unique design consisting of the alternating decking areas and downcomers evenly spaced across the upper surface of the fractionation tray, as shown in FIGS. 5 and 6. However, in a significant number of cases only a single downcomer may be required. The trays of the subject invention may therefore have only a single tray.

The downcomer of a multiple downcomer tray is also unique compared to the downcomers employed upon crossflow fractionation trays. The downcomer does not normally extend downward all the way to the next fractionation tray. Rather it stops at a much higher intermediate level located in the void volume between the two trays. The downcomer descending from the tray above therefore customarily stops well above the deck surface of the lower tray and the inlet to the downcomers of the tray below. Thus there is no inlet weir at the bottom of the downcomer of the tray as there is on a crossflow tray. In the subject invention the stacking of the trays can lessen this feature.

Another distinguishing feature of a multiple downcomer fractionation tray is the provision of a liquid sealable outlet means near the bottom of the downcomer. The bottom of the downcomer is partially closed off to retard the direct downward flow of liquid out of all of the downcomer. This causes the intentional accumulation and retention of sufficient froth to allow the froth to separate into clear liquid and vapor. This liquid sealable outlet is located well above the deck of the tray located immediately below and is preferably at a level above the inlet of the downcomers associated with this next lower tray. The clear liquid is collected in the lower portion of the downcomer and spills forth upon the next lower tray through openings in the bottom of the downcomer. Some liquid may, if desired, also exit through openings in the downcomer side walls. The openings are grouped together and located such that the existing liquid does not fall into a downcomer of the next lower tray. Details on various constructions of the liquid sealable outlet means for rectangular downcomers may be obtained by reference to U.S. Pat. No. 4,159,291 which is incorporated herein for its teaching in regard the construction of rectangular downcomers, decking material and the liquid sealable outlets of the downcomers.

In the embodiments employing V-shaped downcomers, the perforations 15 in the downcomer side walls are preferably arranged in one or more rows running along the major axis of the downcomer. It is preferred that the holes are located in the side walls rather than along the bottom of a V-shaped downcomer. This helps impart horizontal velocity to the egressing liquid causing it to travel away from the downcomer. This is beneficial in spreading the liquid over the decking or any high surface packing which is located below the tray. Openings in the midportion of the wall may also be useful in directing the liquid onto the decking areas of the next tray below depending on the orientation and location of the lower tray decks. The perforations in the downcomer side walls are preferably circular but could have other shapes including horizontal or diagonal slots. The use of a smaller number of larger perforations is preferred although the perforations should be located more or less uniformly along the length of both side walls of the downcomer in a single row to again aid in spreading the liquid. As with rectangular downcomers, holes should not be located directly above, or to discharge into, the downcomers of the tray below. Circular openings of about 0.5–2.5 centimeters diameter are suitable. Another important factor in the placement of the downcomer perforations is the provision of an adequate distance between the upper surface of the tray, which may be coextensive with downcomer inlet, and the perforations to allow the entering froth to separate into clear liquid and vapor. This is important to good tray efficiency and performance in general. This distance should also provide sufficient liquid head to prevent the upward passage of vapor through the downcomer perforations. This desirable placement of the downcomer perforations can be characterized as being in the lower third of the downcomer.

The deck portions between any downcomers on the tray is preferably substantially planar, that is flat, and orientated in a horizontal plane. These decking portions are preferably provided with uniformly distributed openings of adequate total cross-sectional open area to allow the total expected vapor flow to pass upward through the tray at a suitable velocity. Uniform circular openings of a standard sieve tray are preferred but can be supplemented by vapor flow directing slots. The open area provided by deck perforations may vary from 5% to as high as 30–45% of the tray deck area. The circular perforations are usually from about 0.3 to about 0.6 cm but can be up to 1.87 cm in diameter.

The apparatus according to the present invention can be in the form of a new apparatus or a modified existing apparatus. That is, an existing trayed column may be modified to employ the subject invention.

The tray spacing, that is, the vertical distance between the trays will be lower with the subject invention. Multiple downcomer trays are often installed with a tray spacing of about 25 to 50 cm (10–20 inches). Tray spacings down to 25 cm (10 inches) are not unusual and the tray spacing for the subject invention can be as low as 17 cm (7 inches). The tray spacing within the stacked tray bundles can be different from that between the tray bundles. For instance, a larger vertical spacing, e.g., at least 10 percent greater, can be provided between the bundles.

One embodiment of the invention may accordingly be characterized as a fractionation tray bundle for installation in a vertical fractional distillation column having an upper first end and lower second end and used for the separation of volatile chemical compounds by fractional distillation, which tray bundle comprises a first fractionation tray comprising a plurality of parallel downcomers extending below an upper surface of the tray defined by perforated tray decking, with the downcomers having liquid sealable outlets and being separated by perforated decking material; a lower second fractionation tray of substantially identical structure to the first fractionation tray, with the downcomers of the first fractionation tray extending downward and resting on the second fractionation tray such that the upper first fractionation tray is totally supported by the lower second fractionation tray.

A further embodiment of the invention may be characterized as a fractionation column which comprises an enclosed cylindrical outer column having upper and lower ends and associated reboiling and overhead condensing systems; and a plurality of tray bundles vertically spaced apart at uniform distances within the column, with each tray bundle comprising an upper first and a lower second tray of similar design and with the upper first tray being fully supported by the lower second tray.

What is claimed:

1. An apparatus for fractionation distillation of volatile chemical compounds, which apparatus comprises:

a) an enclosed cylindrical column having upper and lower ends and a cylindrical inner surface;

b) an upper first and a lower second fractionation tray of similar design, with the fractionation trays having a downcomer which comprises a sidewall which extends away from a vapor-liquid contacting area formed by perforated decking, and with the upper first tray being solely supported in place within the column by the lower second tray and with the lower second tray being supported by a support attached to the column.

2. The apparatus of claim 1 wherein the downcomer of the upper first tray rests upon an upper portion of the downcomer of the lower second tray.

3. The apparatus of claim 1 wherein the downcomer of the upper first tray rests upon decking of the second tray.

4. The apparatus of claim 1 wherein the downcomer of each tray is formed from two inclined sidewalls which extend downward from the tray and join together at a bottom edge to define a V-shaped downcomer structure.

5. The apparatus of claim 4 wherein the sidewalls do not extend upward beyond the perforated decking.

6. The apparatus of claim 1 wherein the downcomer of the first tray rests upon a vertical baffle extending out of the downcomer of the lower second tray.

7. The apparatus of claim 1 wherein the downcomer sidewalls extend both above and below the vapor-liquid contacting area.

8. The apparatus of claim 1 wherein the perforated decking of the upper first tray has an overall substantially circular periphery which is separated from the inner surface of the column by an unsealed annular gap, which gap allows downward flow of liquid from the decking of the upper first tray to the lower second tray.

9. A fractionation tray bundle for installation in a vertical fractional distillation column having an upper first end and lower second end and used for the separation of volatile chemical compounds by fractional distillation, which tray bundle comprises:

a) a first fractionation tray comprising a plurality of parallel downcomers extending below an upper surface of the tray defined by perforated tray decking having an unsealed circular periphery, with the downcomers having liquid sealable outlets and being separated by perforated decking material; and, b) a lower second fractionation tray of substantially identical structure to the first fractionation tray, with the downcomers of the first fractionation tray extending downward and resting on the second fractionation tray such that the upper first fractionation tray is totally supported by the lower second fractionation tray.

10. The tray bundle of claim 9 wherein the downcomers of the first tray rest upon the downcomers of the second tray.

11. The tray bundle of claim 9 further comprising an attachment means extending between the decking material of the first and second trays.

12. The tray bundle of claim 9 wherein the first tray further comprises a plurality of centering bars which extend outward horizontally across an annular opening located at the periphery of the tray and are adapted for engaging the inner surface of the column.

13. The tray bundle of claim 9 wherein the upper first tray rests, at least in part, upon a vertical disengagement baffle extending upward out of the downcomers of the lower second tray.

* * * * *